Patented Feb. 19, 1929.

1,702,842

UNITED STATES PATENT OFFICE.

LEOPOLD RUZICKA, OF GENEVA, SWITZERLAND, ASSIGNOR TO M. NAEF & CO., OF GENEVA, SWITZERLAND, A COMPANY OF SWITZERLAND.

PROCESS FOR THE PREPARATION OF MONOCYCLIC KETONES AND THEIR ALKYL DERIVATIVES HAVING MORE THAN NINE RING MEMBERS.

No Drawing. Application filed November 19, 1926, Serial No. 149,534, and in Switzerland December 15, 1925.

In the prior application Serial No. 36,049 filed June 9, 1925, there is described a process of preparing monocyclic ketones having more than nine ring members, which comprises heating a normal straight chain aliphatic dicarboxylic acid salt of the fourth group of the periodic system especially thorium and cerium, said acid having a carbon chain containing more than ten carbon atoms, the carboxylic acid groups being linked to the end carbons thereof.

It has also been discovered that in a general manner for the preparation of monocyclic ketones having more than nine ring members and of their alkyl derivatives, from the dicarboxylic acids having more than ten carbon atoms in a normal chain or from their alkyl derivatives, the metals and the compounds of metals belonging to the fourth group of the periodic system may advantageously be employed.

According to the present invention zirconium which belongs to the said metals, or its compounds such as for instance zirconium oxide are employed either alone or mixed with another metal or metal compound belonging to the said fourth group of the periodic system.

It is also advantageous to use a mixture of several metals of the third group of the periodic system or of the rare earths, these mixtures being obtained artificially or otherwise.

Mixtures of the above mentioned dicarboxylic acids or their alkyl derivatives, prepared from the pure acids or as they are obtained in certain technical methods or from natural products give, according to the present invention, mixtures of the ketones, or their alkyl derivatives, which, in this form, can also be employed in practice.

For obtaining the mentioned monocyclic ketones, it is possible to directly heat the acids or the acid anhydrides alone or in presence of metals or metal compounds, at a comparatively high temperature, instead of first transforming the corresponding dicarboxylic acids into salts. In this case the use of metals of the fourth group of the periodic system is also advantageous.

The ketones of their alkyl derivatives obtained by the described process can be used as perfumes or as primary materials for the preparation of other technically important compounds.

Example 1.

The zirconium salt of 3-methyl-tetradecane-1.14-dicarboxylic acid is heated, preferably in a vacuum, up to a temperature of 300° C. to 500 degrees centigrade and the distillate obtained therefrom is worked up by fractional distillation. The fractions distilling at from 100 to 150° C. at a pressure of 0.5 mm. are then treated with semicarbazide or other reagent usually employed for isolating the ketones.

The formation of the 3-methyl-cyclopentadecanone can be represented by the following equation:

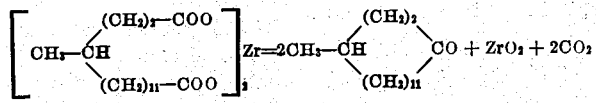

The pure 3-methyl-cyclopentadecanone can also be isolated by treating with acids the semicarbazone purified by crystallization in alcohol and melting at about 164° C.

The 3-methyl-cyclopentadecanone boils at 125° C. (at 0.3 mm.) and has a smell like that of natural musk and can therefore be used as perfume as well as a primary material for preparing other interesting technical compounds.

Example 2.

3-methyl-tetradecane-1.14-dicarboxylic acid is heated up to above 300 to 500 degrees centigrade and towards the end of the reaction preferably in a vacuum with zirconium hydroxide in a quantity which does not suffice for completely converting the acid into the normal salt. The product obtained is treated according to the method described in Example 1.

Example 3.

A mixture of the zirconium and thorium salts of 4-methyl-tetradecane-1.14-dicarboxylic acid is heated and worked up as described in Example 1. The 4-methyl-cyclopentadecanone obtained boils at about 125° C. (at 0.3 mm.) gives a semicarbazone melting at about 166° C. and has a smell like that of natural musk and can therefore be used as a perfume and for preparing other interesting technical compounds.

Example 4.

4-methyl-tetradecane-1.14-dicarboxylic acid is heated at about 300 to 500° C. and towards the end of the reaction preferably in a vacuum, with zirconium oxide. The product obtained is worked up as described in Example 3.

Example 5.

The zirconium salt of tetradecane-1.14-dicarboxylic acid is heated and worked up as described in Example 1. The cyclo-pentadecanone is obtained which distills at about 120° C. (at 0.3 mm.) and melts at 63° C.

Example 6.

Tetradecane-1.14-dicarboxylic acid is heated at about 300 to 500° C. towards the end of the reaction preferably in vacuum, with zirconium hydroxide. The distillate resulting therefrom is worked up as described in Example 5.

Example 7.

3-methyl-tetradecane-1.14-dicarboxylic acid is heated to about 300 to 500° C. towards the end of the reaction preferably in a vacuum. The distillate which results therefrom is worked up as described in example 5.

Example 8.

The anhydride of tetradecane-1.14-dicarboxylic acid is heated to about 300 to 500° C. towards the end of the reaction preferably in a vacuum with zirconium hydroxide and worked up as described in Example 5.

Example 9.

The anhydride of 4-methyl-tetradecane-1.14-dicarboxylic acid is heated to about 300 to 500° C. towards the end of the reaction preferably in a vacuum with zirconium hydroxide and worked up as described in Example 5.

Example 10.

A zirconium salt of tetradecane-1.14-dicarboxylic acid which has been prepared by adding zirconium nitrate to the solution of the sodium-salt of this acid in a quantity which does not suffice for completely converting the acid into the normal salt, is heated and worked up as described in Example 1.

Example 11.

The zirconium salt of octadecane-1.18-dicarboxylic acid is heated preferably in a vacuum to about 300 to 500° C. and the resulting distillate is worked up by fractional distillation. The fraction distilling at from 140 to 180° C. (at 0.3 mm.) is then treated with semicarbazide or other reagent usually employed for isolating the ketones. The cyclononadecanone in a pure state can in this manner be isolated by treating the semicarbazone purified by crystallization from alcohol, and melting at 184° C. This ketone boils at 160° C. (at 0.3 mm.), melts at 72° C. and has a smell which nearly corresponds to that of civetone. It can therefore be used as a perfume and as an intermediate for preparing other interesting technical compounds; by oxidizing the cyclononadecanone with chromic acid heptadecane-1.17-dicarboxylic acid is formed.

Example 12.

A mixture of cyclopentadecanone and cyclohexadecanone is obtained by working up according to the method described in Example 1 a mixture of zirconium and lanthanum salts of tetradecane-1.14-dicarbolic and pentadecane-1.15-dicarboxylic acid.

I claim:

1. A process for the preparation of monocyclic ketones having more than nine ring members comprising heating zirconium salts of polymethylene dicarboxylic acids, having more than ten carbon atoms in a normal chain the carboxylic acid groups being linked to the end carbons thereof.

2. A process for the preparation of monocyclic ketones having more than nine ring members comprising heating a mixture of polymethylene dicarboxylic acid salts of metals belonging to the fourth group of the periodic system having more than ten carbon atoms in a normal chain the carboxylic acid groups being linked to the end carbons thereof.

3. A process for the preparation of monocyclic ketones having more than nine ring members comprising heating a mixture of zirconium and thorium salts of polymethylene dicarboxlic acids having more than ten carbon atoms in a normal chain the carboxylic acid groups being linked to the end carbons thereof.

In testimony whereof I affix my signature.

LEOPOLD RUZICKA.